US012542394B2

(12) United States Patent
Chaware et al.

(10) Patent No.: US 12,542,394 B2
(45) Date of Patent: Feb. 3, 2026

(54) BOARD-TO-BOARD (B2B) CONNECTOR FOR IMPROVED PERFORMANCE AND STRENGTH AND METHOD OF MAKING SAME

(71) Applicants: Raghunandan Chaware, Sunnyvale, CA (US); Tarangini Deshpande, Menlo Park, CA (US)

(72) Inventors: Raghunandan Chaware, Sunnyvale, CA (US); Tarangini Deshpande, Menlo Park, CA (US)

(73) Assignees: Raghunandan Chaware, Sunnyvale, CA (US); Tarangini Deshpande, Menlo Park, CA (US)

( * ) Notice: Subject to any disclaimer, the term of this patent is extended or adjusted under 35 U.S.C. 154(b) by 487 days.

(21) Appl. No.: 17/727,102

(22) Filed: Apr. 22, 2022

(65) Prior Publication Data

US 2022/0344861 A1 Oct. 27, 2022

Related U.S. Application Data

(60) Provisional application No. 63/178,869, filed on Apr. 23, 2021.

(51) Int. Cl.

| | |
|---|---|
| ***H01R 13/50*** | (2006.01) |
| ***H01R 12/71*** | (2011.01) |
| ***H01R 13/6581*** | (2011.01) |
| ***H01R 13/6598*** | (2011.01) |
| ***H01R 43/18*** | (2006.01) |

(52) U.S. Cl.

CPC ........... *H01R 13/50* (2013.01); *H01R 12/716* (2013.01); *H01R 13/6581* (2013.01); *H01R 13/6598* (2013.01); *H01R 43/18* (2013.01)

(58) Field of Classification Search

None

See application file for complete search history.

(56) References Cited

U.S. PATENT DOCUMENTS

| | | | | |
|---|---|---|---|---|
| 4,293,182 | A * | 10/1981 | Schwartz | H01R 43/18 264/254 |
| 5,904,581 | A * | 5/1999 | Pope | H01R 24/60 439/74 |
| 8,979,551 | B2 | 3/2015 | Mongold et al. | |
| 9,350,095 | B2 | 5/2016 | Arichika et al. | |
| 9,595,787 | B2 | 3/2017 | Qiao et al. | |
| 9,638,871 | B2 | 5/2017 | Bund et al. | |
| 9,825,391 | B2 | 11/2017 | Cohen et al. | |

(Continued)

FOREIGN PATENT DOCUMENTS

| | | |
|---|---|---|
| JP | 4949386 B2 | 6/2012 |
| JP | 2014519149 A | 8/2014 |
| JP | 6797677 B2 | 12/2020 |

OTHER PUBLICATIONS

Stieglitz, C., "Board-to-Board Connector Products", Connector Supplier, https://connectorsupplier.com/board-to-board-connector-products-Oct. 2019/, Oct. 29, 2019, Updated: Feb. 23, 2022, 10 Pages.

*Primary Examiner* — Oscar C Jimenez

(74) *Attorney, Agent, or Firm* — Haynes and Boone, LLP

(57) ABSTRACT

According to embodiments, a board-to-board (B2B) connector component includes an array of contacts and a housing holding the array of contacts. At least a portion of the housing is made of glass.

20 Claims, 25 Drawing Sheets

(56) References Cited

U.S. PATENT DOCUMENTS

| | | | | |
|---|---|---|---|---|
| 10,476,214 | B2 | 11/2019 | Golko et al. | |
| 2011/0294348 | A1* | 12/2011 | Mcalonis ............. | H01R 13/514 439/607.23 |
| 2013/0012039 | A1 | 1/2013 | Nose et al. | |
| 2013/0280926 | A1 | 10/2013 | Ono | |
| 2014/0220830 | A1* | 8/2014 | Kubo ..................... | H01R 13/04 439/660 |
| 2014/0363991 | A1 | 12/2014 | Ryan et al. | |
| 2016/0226202 | A1* | 8/2016 | Paynter .................. | H01R 24/42 |
| 2023/0393355 | A1* | 12/2023 | Zbinden ............... | G02B 6/4278 |

* cited by examiner

130

150

170

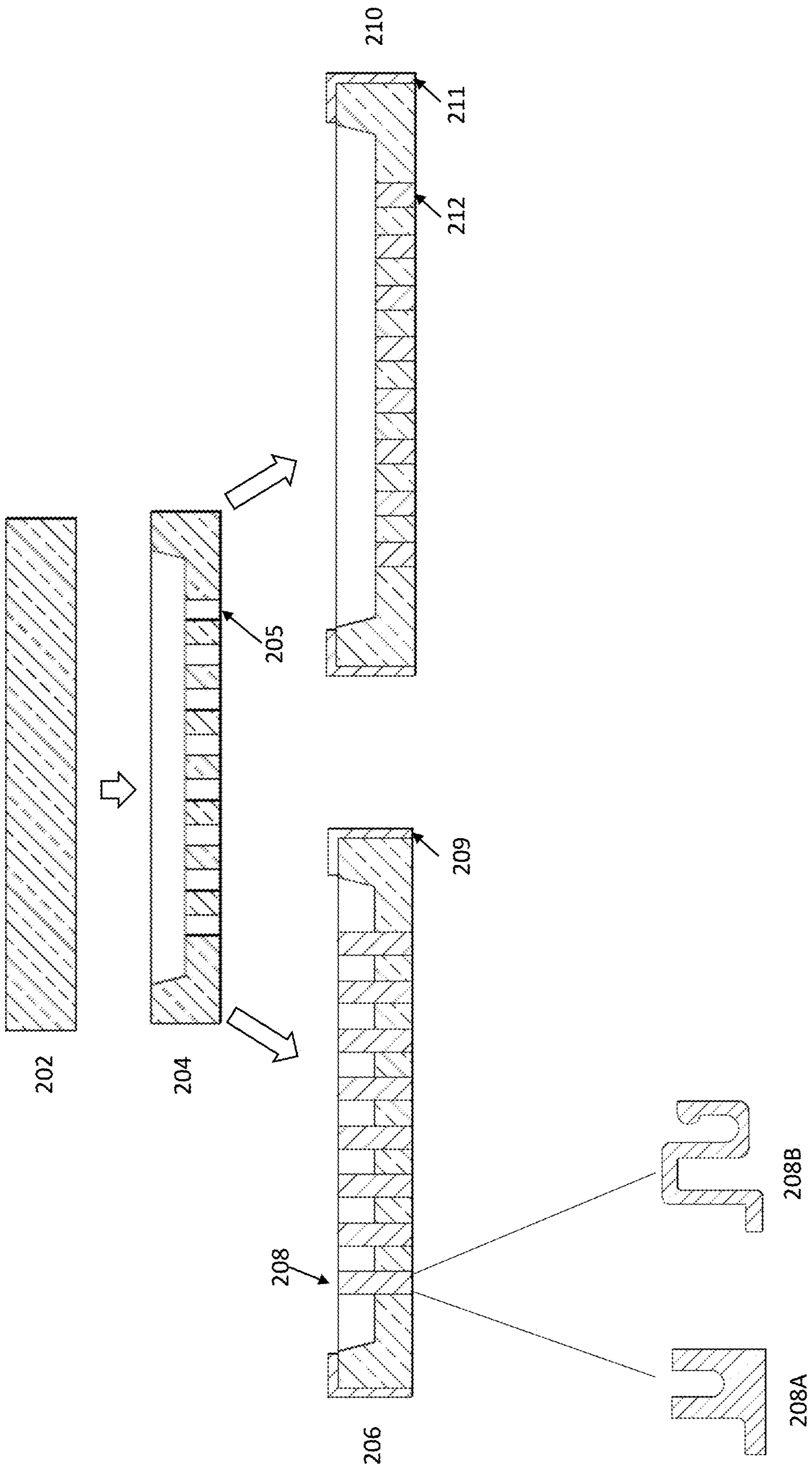
FIG. 2A1

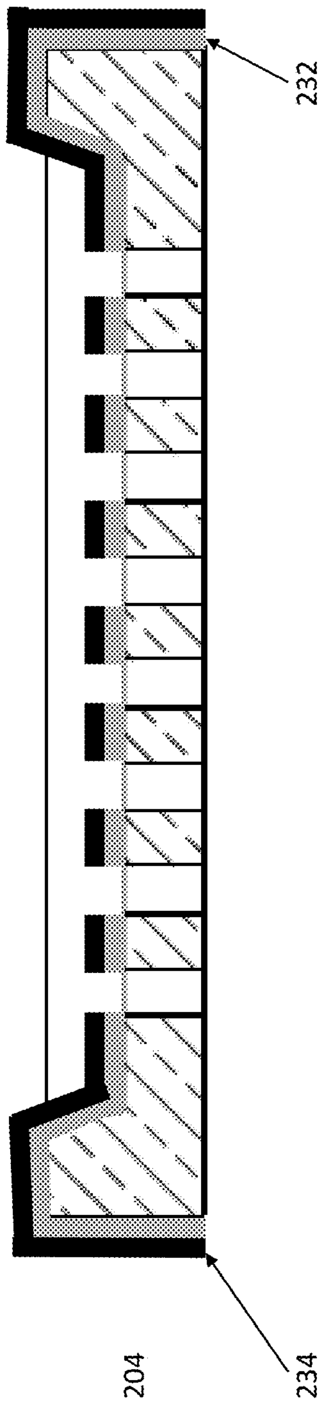
FIG. 2A2

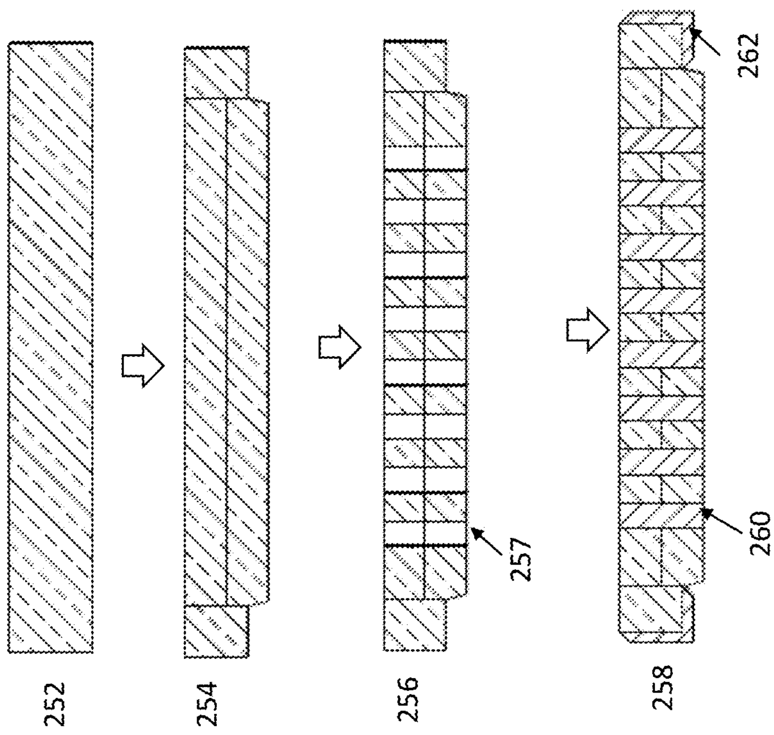
FIG. 2B1

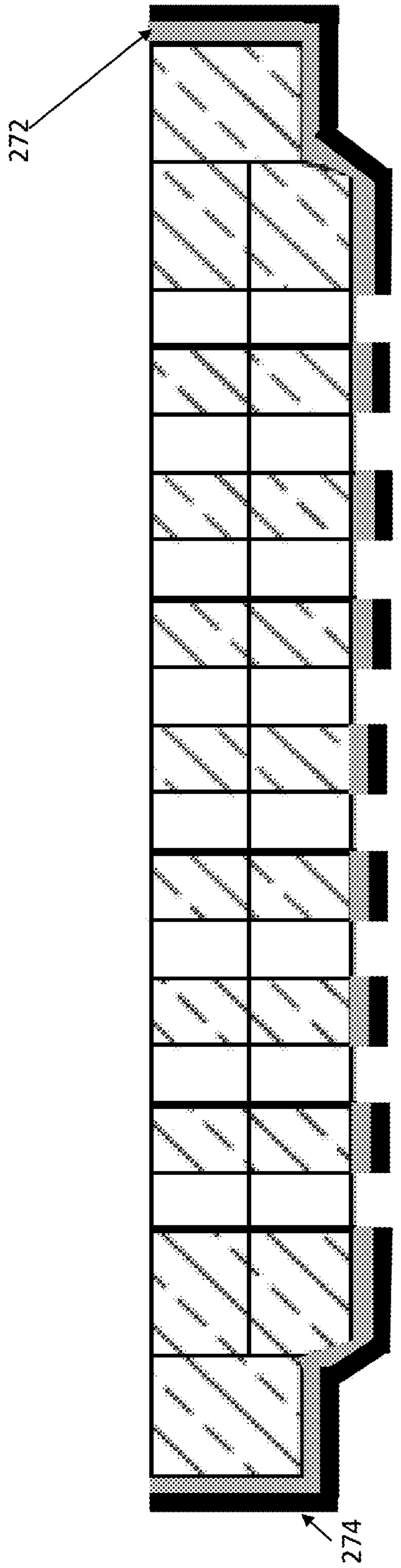
FIG. 2B2
256

300

300

400

400

500

500

500

600

600

800

BOARD-TO-BOARD (B2B) CONNECTOR FOR IMPROVED PERFORMANCE AND STRENGTH AND METHOD OF MAKING SAME

CROSS-REFERENCE TO RELATED APPLICATIONS

This application claims the benefit of U.S. Provisional Application No. 63/178,869 filed Apr. 23, 2021, application of which is incorporated by reference in its entirety.

TECHNICAL FIELD

The present invention relates generally to systems and methods for electrical connectors, and, in particular embodiments, to systems and methods for board-to-board (B2B) connectors.

BACKGROUND

Board-to-board (B2B) connectors are widely used in various commercial and industrial products to connect subsystems, such as sensor modules and specific function boards to the main board. A B2B connector allows efficient use of space in a particular product and enables modular design of the whole system.

A B2B connector typically includes two parts—a plug and a receptacle. In handheld devices such as smartphones, smartwatches, tablets, cameras, and thin laptops etc., the receptacle is often soldered onto a main printed circuit board (PCB), and the plug is connected to a flexible printed circuit (FPC) cable, which, in turn, is usually connected to a sensor module (e.g., a camera module).

In the last 30 plus years, semiconductor integrated circuits (ICs) have followed Moore's law and have continued to shrink in size while improving their performance every year. Even passive components such as resistors, capacitors, and inductors have shrunk in size to enable more compact designs on smaller motherboards. However, electrical connectors, such as B2B connectors, have not changed much over time, and there is no clear roadmap or disruptive innovation to fundamentally change the B2B connectors' construction and performance.

The current B2B connectors are very large relative to the IC chips on the board. The large B2B connector size is most commonly caused by the following factors. First, the conventional B2B connectors' use of plastic materials to encapsulate metal contacts in the B2B connectors. The plastic materials used for these conventional B2B connectors have low dielectric strength and require connector leads (e.g., metal contacts) to be spaced apart enough to prevent shorting from electrical breakdown of the plastic wall between the connector leads. Furthermore, the connector body of a conventional B2B connector by itself is not strong enough to withstand insertion and removal forces. Therefore, end caps are used to provide rigidity to the body of the conventional B2B connector. These end caps can take up as much as 30-50% of the overall space occupied by the conventional B2B connector on the main board. In addition, the stamped metal shielding layer is insert molded into the conventional B2B connector for use in high frequency applications. The stamped metal shielding layer can drive the connector footprint up by 40-50%.

The majority of conventional B2B connectors use plastic for their main bodies. An important technical drawback of a conventional plastic molded B2B connector is that, if the B2B connector is too large or too slender, the B2B connector can easily warp during connector manufacturing or break during board assembly while manually inserting the plug into the receptacle. Due to these technical issues, B2B connector manufacturers are unable to offer a B2B connector with 100+ pins for smartphones or small devices today.

There are even more limitations of the conventional B2B connectors manufactured today. The conventional B2B connectors occupy relatively large space on their boards. The conventional B2B connectors use plastic or polymeric compounds for their bodies. These plastics or polymeric bodies do not have high dielectric strength and require the B2B connector leads (e.g., contacts) to be spaced apart enough to meet the current carrying capacity and avoid breakdown. Very small B2B connectors and/or B2B connectors with a large number of pins (e.g., 90+ pins) cannot be made with the existing designs and materials. The conventional B2B connectors with shielding capability require even larger space due to stamped metal cage insert molded around the leads. Contact spacing of these conventional B2B connectors is large (e.g., usually 100+ microns (μm)), and the contact area of the leads can vary. The end caps of a conventional B2B connector could occupy a significant amount of space on a board. In addition, plastic materials used as the body (e.g., housing) of a conventional B2B connector can be easily chafed or scratched, creating small particle residues that can obstruct contacts during attachment.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A1-2A2 illustrate cross-section views of a process flow for creating the receptacle of a B2B connector, according to some embodiments;

FIGS. 2B1-2B2 illustrate side views of a process flow for creating the plug of a B2B connector, according to some embodiments;

FIG. 2DB shows cross-section views of how the metal contacts of a plug are connected to the metal contacts of a receptacle when the plug is inserted into the receptacle, according to some embodiments;

DETAILED DESCRIPTION OF ILLUSTRATIVE EMBODIMENTS

Figure 1A:
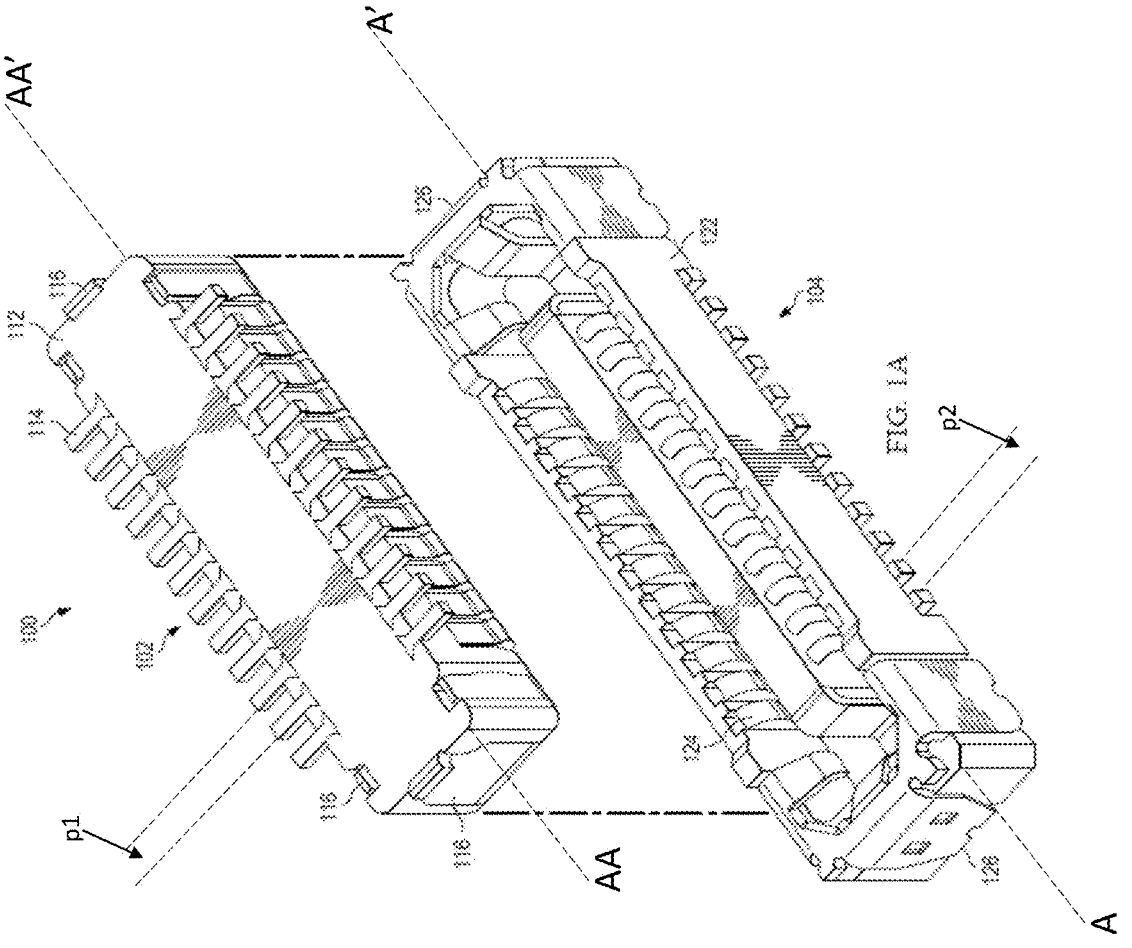
FIG. 1A illustrates a perspective view of an example B2B connector, according to some embodiments.

The following disclosure provides many different embodiments, or examples, for implementing different features of the application. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

According to embodiments, the body of a B2B connector can be made from structured glass or ceramic material. For ease of explanation, embodiments in this disclosure may use the glass as an illustrative example, but the embodiments described herein can also be applied by replacing glass with the ceramic material.

According to some embodiments, a glass sheet can be transformed into the desired shape with the use of lasers. Based on the design and application of the B2B connector, the glass may be irradiated with a precision laser. Exposure to the laser changes the glass structure locally and makes it easy to etch that portion of the exposed glass. With multiple exposure and etching steps, specific patterns and shapes can be created with the glass. According to other embodiments, a glass sheet can be transformed into the desired shape using lithographic and etching techniques. For example, in some embodiments, a photomask (not explicitly illustrated) may be formed over the glass sheet using a spin-on process, for example, and the photomask may be exposed and developed to define openings in the photomask. The openings in the photomask may correspond to the desired patterns and shapes to be created within the glass sheet. After the photomask is patterned, the pattern may be transferred to the glass sheet using one or more etching processes (e.g., a dry etch process, a wet etch process, or the like). Subsequently, the photomask may then be removed.

FIG. 1A illustrates a perspective view of an example B2B connector 100, according to some embodiments. The B2B connector 100 includes the plug 102 and the receptacle 104. The plug 102 includes the metal contacts 114, the housing 112 holding the metal contacts 114, and the end caps 116. The receptacle 104 includes the metal contacts 124, the housing 122 holding the metal contacts 124, and the end caps 126. The housing 112 and the housing 122 may each be made of glass or ceramic material, according to some embodiments. In some embodiments, the main body of the housing 112 and the housing 122 are made of glass or ceramic material, and the main body of the housings 112 and the housing 122 may be coated with one or more other materials (e.g., a dielectric material, a metal, or the like). When the housing 112 and the housing 122 are made of glass, they can be transparent. Transparent housing(s) can help facilitate diagnosis issues of the B2B connector. The housing (e.g., the housing 112 and the housing 122) may also hold at least one of a capacitor or an inductor (not shown in FIG. 1A). In some embodiments, the housing (e.g., the housing 112 and the housing 122) may include a frame made of glass, and the contacts (e.g., the metal contacts 114 or the metal contacts 124) may be at least partially disposed in the openings in the frame. The housing (e.g., the housing 112 and the housing 122) may further include an organic material or a polymeric compound as the dielectric layer encasing the frame. In some embodiments, Ajinomoto build-up film (ABF), prepreg dielectric film, a mold compound, or like materials may be laminated to encase the frame. For example, a thick dielectric film may be vacuum laminated, and the dielectric film can flow during the lamination to cover all walls of the frame. In some other embodiments, the mold compound may be molded around all walls of the frame using transfer molding or injection molding.

The use of the structured glass in the housing (e.g., housing 112 and housing 122) enables creation of a smaller sized connector (e.g., B2B connector 100). Unlike the plastic materials with low dielectric strength used for conventional B2B connectors, the high dielectric strength of the glass allows the metal contacts to be assembled closer to each other yet can still prevent shorting from electrical breakdown of the glass wall. In some embodiments, the pitch p1 between two neighboring contacts of the contacts 114 is between 50 μm and 2 mm, and the pitch p2 between two neighboring contacts of the contacts 124 is between 50 μm and 2 mm. In some embodiments, the metal contacts (e.g., the contacts 114 or the contacts 124) are made of glass coated with a metal material.

For illustration purpose, FIG. 1A shows 12 metal contacts 114 on one side of the housing 112 and 12 metal contacts 124 on one side of the housing 122. The embodiment B2B connector can hold more metal contacts than FIG. 1A shows. In some embodiments, there can be at least 100 metal contacts on one side of a housing (e.g., the housing 112 or the housing 114) when the length of the B2B connector is at most 1 cm or even 5 mm.

A dielectric constant of the main body of the housing (e.g., the housing 112 or the housing 122) is in a range between 3 to 10. For example, a D4 glass may be used to a achieve a relatively low dielectric constant and reduce capacitive coupling in the resulting housing (e.g., the housing 112 or the housing 122). A dielectric strength of the main body of the housing (e.g., the housing 112 or the housing 122) is at least 10 MV/m. A modulus of rigidity of the main body of the housing (e.g., the housing 112 or the housing 122) is at least 20 gigapascals (GPa). A coefficient of thermal expansion (CTE) of the main body of the housing (e.g., the housing 112 or the housing 122) is at most $9.0\times10^{-6}$ m/(m K). The main body of the housing (e.g., the housing 112 or the housing 122 made of glass) may occupy at least 50% (and up to 100%) of the housing in volume. In some embodiments, the dielectric constant of the housing may be at least 3, the dielectric strength of the housing may be at least 14 MV/cm, and the coefficient of thermal expansion (CTE) of the housing may be at most $8\times10^{-6}$ m/(m K). Using the material (e.g., glass) with the dielectric constant and/or the dielectric strength described here to occupy at least 50% of the housing in volume can effectively prevent electrical shorting even if the connector leads in the housing are spaced close to each other. Using the material as described here allows two neighboring contacts (e.g., two neighboring contacts of the contacts 114 or the contacts 124) to be placed as close as 50 μm in terms of the pitch between the two neighboring contacts. Also, being able to place the contacts so much closer to each other also enables fitting more leads with a small sized B2B connector. For example, the B2B connector 100 of the length 5 mm can hold more than 100 metal contacts. Furthermore, using the material with the modulus of rigidity and/or CTE described above to occupy at least 50% of the housing in volume can provide enough strength to prevent warping and also prevent manufacturing defects (e.g., chafes or scratches) from small particle residue.

End caps are used to provide rigidity to the body of a B2B connector. End caps are metal structures wrapped around both ends of the housing of a plug (or a receptacle) along the longitude axis. Furthermore, an end cap of the housing of a receptacle includes a recess for plugging in the corresponding end cap of the housing of a plug. End caps may also be used to ensure alignment during insertion of the plug 102 into the housing 122. The material used in a conventional B2B connector can warp more easily. So, the end caps in the conventional B2B connector are relatively large and can take up as much as 30-50% of the overall space occupied by the conventional B2B connector to provide sufficient structural stability. In contrast, in FIG. 1A, the end caps 116 of the housing 112 of the plug 102 and the end caps 126 of the housing 122 of the receptacle 104 in the B2B connector 100 can be significantly smaller (e.g., due to the extra housing strength provided by the material described above) than the end caps used in a conventional B2B connector due to the use of glass in the housing 122 and the housing 112, which provides improved structural stability in the B2B connectors without requiring end caps of a particular size. In some embodiments, the total length of the end caps 116 is at most 25% of the length of the B2B connector 100, and the total length of the end caps 126 is at most 25% of the length of the B2B connector 100. In some embodiments, the B2B connector 100 does not include any end caps, and the end caps 116 and 126 may be omitted from the B2B connector 100.

For a conventional B2B connector with high frequency usage applications, a stamped metal shielding frame is often insert molded into the conventional B2B connector to provide additional strength support for the conventional B2B connector. However, the metal shielding frame also occupies significant space, driving up the footprint of the conventional B2B connector even further. In contrast, in some embodiments, the B2B connector 100 does not need to have any metal shielding frame. Rather than having the metal shielding frame, the B2B connector 100 may be deposited (e.g., sputtered) with a metal coating layer made of at least one of Ti, Cu, Ni, Au, or Fe, or combinations thereof. The metal coating layer for the B2B connector 100 is a lot thinner and occupies significantly less space than a metal shielding frame used in a conventional B2B connector, yet the thin metal coating layer and the material used for the housing (e.g., the housing 112 or the housing 122) together provide sufficient strength for the B2B connector 100.

In some embodiments, the housing (e.g., the housing 112 or the housing 122) may include at least one dielectric film layer on the main body of the housing. The at least one dielectric film layer may be made of at least one of $SiO_x$, $SiN_x$, $TaN_x$, $TiO_2$, $Al_2O_3$, or hafnium oxide ($HfO_x$ such as $HfO_2$).

Figure 1B:
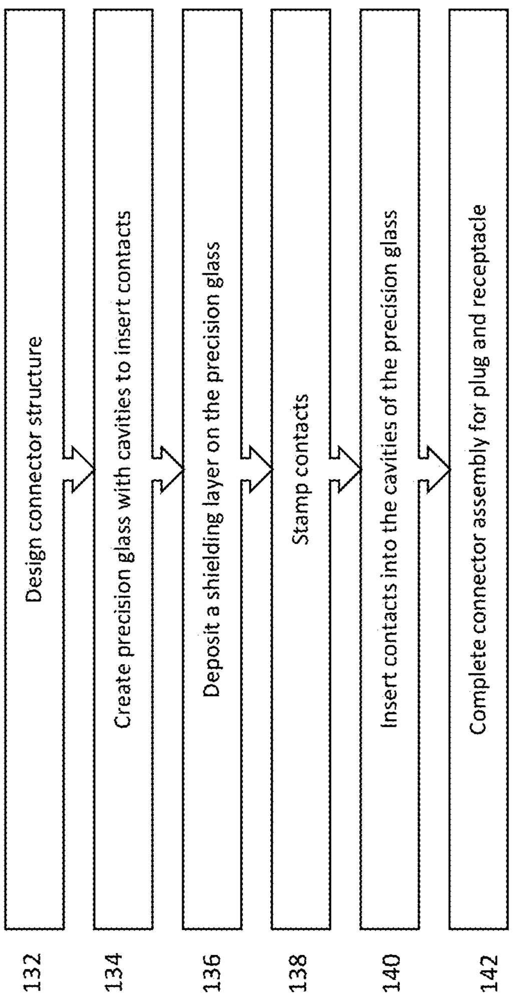
FIG. 1B illustrates a process flow for B2B connector assembly, according to some embodiments.

FIG. 1B illustrates a process flow 130 for B2B connector assembly, according to some embodiments. The process flow 130 may be used to assemble the B2B connector 100. At operation 132, the structure of the receptacle (e.g., the receptacle 104) or the plug (e.g., the plug 102) of the B2B connector is designed. For example, the design may determine the shape of the receptacle or the plug of the B2B connector and determine the cavities for holding the metal contacts to be created in the base glass. At operation 134, based on the design, a precision glass (e.g., the base structure) with cavities is created from the base glass. A precision glass may refer to a glass having structures (e.g. cavities) with a few microns (μm) of dimensional tolerance for the structures in the glass. The precision glass may be created by using the lasers, etching steps, lithographic techniques described above, or combinations thereof. The cavities of the precision glass are for later insertion of the metal contacts. The precision glass may be the base structure for the housing for a plug (e.g., the housing 112) or for the housing of a receptacle (e.g., the housing 122) depending on the design. At operation 136, a shielding layer is deposited on top of the precision glass. The shielding layer may be a dielectric layer made of, for example, $SiN_x$, $SiO_x$, $TiO_2$, or $TaN_x$. The deposition of the dielectric layer may be achieved by using physical vapor deposition (PVD), chemical vapor deposition (CVD), metalorganic chemical vapor deposition (MOCVD), spraying, spin coating, dipping, lamination, the like, or combinations thereof. At operation 138, the metal contacts may be stamped to fit the shape and size of the cavities in the precision glass. At operation 140, the metal contacts are inserted into the cavities of the precision glass. At operation 142, after the plug and the receptacle are each created using the operations described above, the connector assembly for the plug and the receptacle completes.

Figure 1C:
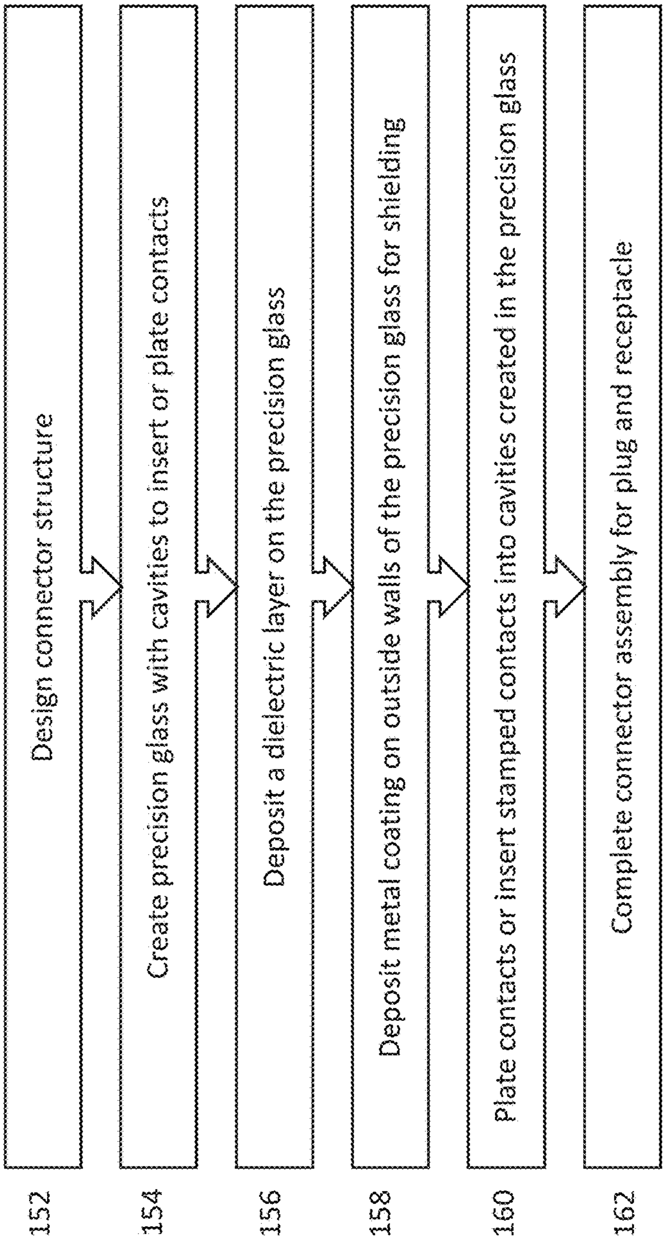
FIG. 1C illustrates a process flow for B2B connector assembly, according to some embodiments.

FIG. 1C illustrates a process flow 150 for B2B connector assembly, according to some embodiments. The process flow 150 may be used to assemble the B2B connector 100. At operation 152, the structure of the receptacle (e.g., the receptacle 104) or the plug (e.g., the plug 102) of the B2B connector is designed. For example, the design may determine the shape of the receptacle or the plug of the B2B connector and determine the cavities for holding the metal contacts to be created in the base glass. At operation 154, based on the design, a precision glass (e.g., the base structure) with cavities is created from the base glass. The precision glass may be created by using the lasers, etching steps, lithographic techniques described above, or combinations thereof. The cavities of the precision glass are for later insertion or plating of the metal contacts. The precision glass may be the base structure for the housing of a plug (e.g., the housing 112) or for the housing of a receptacle (e.g., the housing 122) depending on the design. At operation 156, a dielectric layer is deposited on top of the precision glass. The dielectric layer may be made of, for example, $SiN_x$, $SiO_x$, $TiO_2$, or $TaN_x$. At operation 158, a metal coating layer may be deposited (e.g., sputtered) on the outside walls of the precision glass. The metal coating layer may be deposited using Ti, Cu, Ni, Au, the like, or combinations thereof. At operation 160, the metal contacts are plated (or the stamped metal contacts are inserted) into the cavities of the precision glass. At operation 162, after the plug and the receptacle are each created using the operations described above, the connector assembly for the plug and the receptacle completes.

Figure 1D:
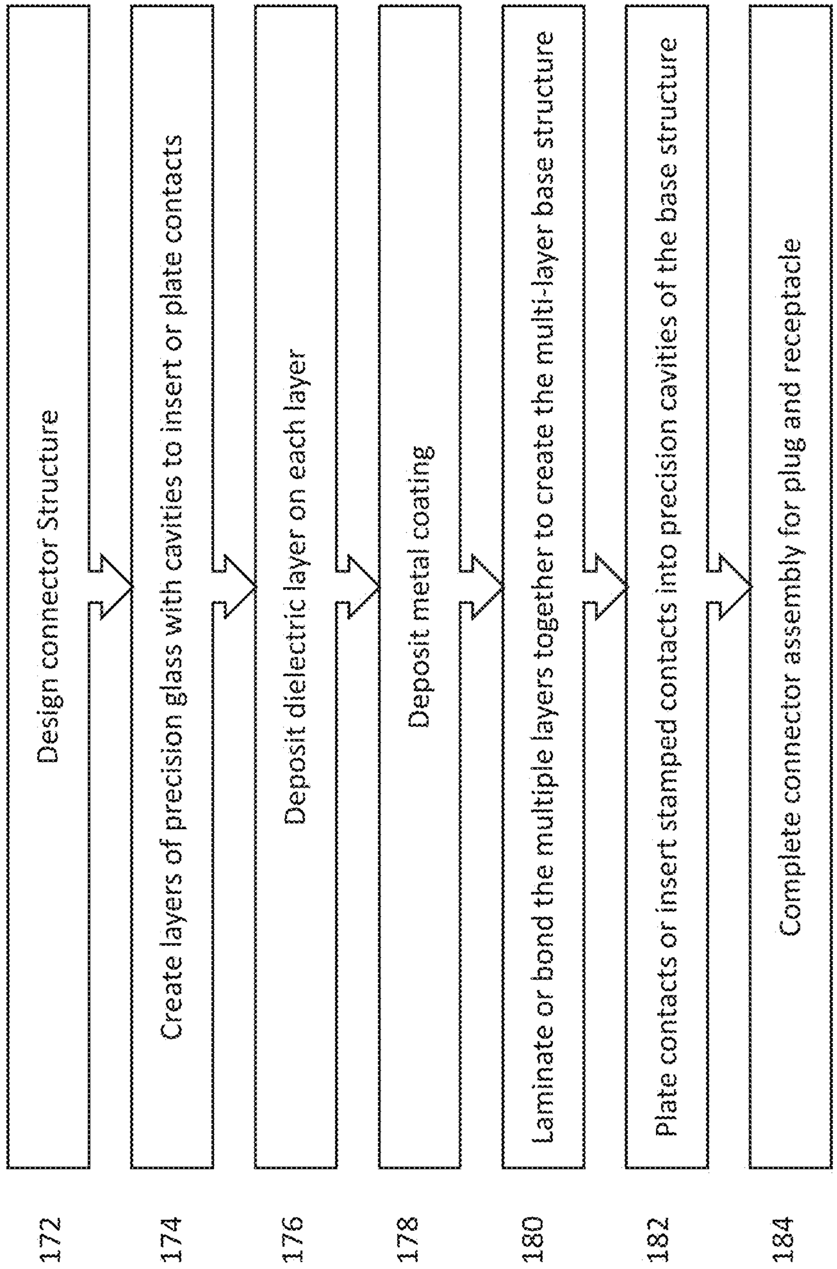
FIG. 1D illustrates a process flow for B2B connector assembly, according to some embodiments.

FIG. 1D illustrates a process flow 170 for B2B connector assembly, according to some embodiments. The process flow 170 may be used to assemble the B2B connector 100. The glass base structure could be formed by bonding or laminating multiple layers of glass, each deposited (e.g. sputtered) with the metal coating layer and deposited separated by dielectric layers. In addition, some portion of the glass may be used to create one or more capacitors within the body of the B2B connector. At operation 172, the structure of the receptacle (e.g., the receptacle 104) or the plug (e.g., the plug 102) of the B2B connector is designed. For example, the design may determine the shape of the receptacle or the plug of the B2B connector and determine the cavities for holding the metal contacts to be created in the base glass. At operation 174, based on the design, multiple layers of precision glass, each with cavities, are created from multiple layers of base glass. Each layer of the multiple layers of precision glass may be created by using the lasers, etching steps, lithographic techniques described above, or combinations thereof. The multiple layers of precision glass to be laminated or bonded together later may form the base structure. The cavities of the multiple layers of precision glass are for later insertion or plating of the metal contacts. The multiple layers of precision glass together may be the base structure for the housing of a plug (e.g., the housing 112) or for the housing of a receptacle (e.g., the housing 122) depending on the design. At operation 176, a dielectric layer is deposited on top of each layer of the multiple layers of precision glass. The dielectric layer may be made of, for example, $SiN_x$, $SiO_x$, $TiO_2$, or $TaN_x$. At operation 178, a metal coating layer may be deposited on the outside walls of each layer of the multiple layers of precision glass. The metal coating layer may be deposited using Ti, Cu, Ni, Au, the like, or combinations thereof. At operation 180, the multiple layers of precision glass (deposited with the dielectric layers and deposited with metal coating layers) are laminated or bonded together to create the multi-layer base structure for the plug or the receptacle of the B2B connector. At operation 182, the metal contacts are plated (or the stamped metal contacts are inserted) into the cavities of the base structure. At operation 184, after the plug and the receptacle are each created using the operations described above, the connector assembly for the plug and the receptacle completes.

The orders of the process flows described above with respect to FIGS. 1B-1D are not meant to be limiting. For example, in the process flow option 170, multiple layers of base glass can be combined together while creating the cavities in the multiple layers of base glass to create multiple layers of precision glass. Then, each layer of the multiple layers of precision glass may separately deposited with a dielectric layer and deposited with a metal coating layer before the multiple layers of precision glass are laminated or bonded together. In another embodiment, cavities are created in each layer of the base glass separately. Then, each layer of the glass is separately deposited with a dielectric layer and deposited with a metal coating layer before being laminated or bonded together. In yet another embodiment, each layer of the base glass is separately deposited with a dielectric layer and deposited with a metal coating layer before being laminated or bonded together. After the laminating or the bonding, cavities are created in the multiple layers of the base glass.

FIG. 2A1 illustrate cross-section views (along the A-A' direction shown in FIG. 1A) of a process flow for creating the receptacle of a B2B connector (e.g., the B2B connector 100), according to some embodiments. The precision glass 204 (e.g., the base structure of the housing 112) is created from the base glass 202. The precision glass 204 includes cavities 205. In some optional embodiments, after the cavities 205 are created, the precision glass 204 may be deposited with a dielectric layer and/or deposited with a metal coating layer on all surfaces of the precision glass 204 (including on all the surfaces in the cavities of the precision glass 204 but may exclude the surface of the precision glass 204 supported by the platen at the deposition time). In some other optional embodiments, the base glass 202 may be deposited with the dielectric layer 232 and/or deposited with the metal coating layer 234 on all surfaces of the base glass 202 (except the surface of the base glass 202 supported by the platen at the deposition time) first, and then the precision glass 204 with the cavities 205 is created, as shown FIG. 2A2. In some optional embodiments, after the cavities 205 are created, the precision glass 204 may be deposited with a dielectric layer on all surfaces of the precision glass 204 (except the surface of the precision glass 204 supported by the platen at the deposition time). Then, the metal coating layer may be deposited selectively. For example, the metal coating layer may be deposited, and some areas of the metal coating layer that are not needed for connection formation may be removed through one or more lithography and/or etching steps.

Next, in some embodiments, the metal contacts 208 may be formed in the cavities 205 of the precision glass 204. Other structures, such as end caps 209, may be attached to form the receptacle 206. In some embodiments, the metal contacts 208 may be stamped metal contacts 208A or 208B, which are pre-formed and then placed within the cavities 205 of the precision glass 204. In some embodiments, the metal contacts 212 may be formed using one or more plating processes in the cavities 205 of the precision glass 204. The metal contacts 208 are separated from one another by the glass walls or by the dielectric layer. In some embodiments, instead of using the stamped metal contacts (e.g., 208A or 208B), metal material may be deposited or formed in areas where metal is needed. Other structures, such as end caps 211, may be attached to form the receptacle 210. The receptacle 206 or the receptacle 210 in FIG. 2A1 may be the receptacle 104 of the B2B connector 100 in FIG. 1A.

FIG. 2B1 illustrate side views (along the AA-AA' direction shown in FIG. 1A) of a process flow for creating the plug of a B2B connector (e.g., the B2B connector 100), according to some embodiments. The structure 254 is created from the base glass 252. The shape of the structure 254 matches the corresponding openings in the receptacle (e.g., the receptacle 206 or 210) to help the plug being inserted into the receptacle. The precision glass 256 (e.g., the base structure of the housing 112) is created from the structure 254. The precision glass 256 includes cavities 257. In some optional embodiments, after the cavities 257 are created, the precision glass 256 may be deposited with a dielectric layer and/or deposited with a metal coating layer on all surfaces of the precision glass 256 (including on all the surfaces in the cavities of the precision glass 256 but may exclude the surface of the precision glass 256 supported by the platen at the deposition time). In some other optional embodiments, the base glass 252 may be deposited with the dielectric layer 272 and/or deposited with the metal coating layer 274 on the all surfaces of the base glass 252 first (except the surface of the base glass 252 supported by the platen at the deposition time), and then the precision glass 256 with the cavities 257 is created, as shown FIG. 2B2. In some optional embodiments, after the cavities 257 are created, the precision glass 256 may be deposited with a dielectric layer on all surfaces of the precision glass 256 (except the surface of the precision glass 256 supported by the platen at the deposition time). Then, the metal coating layer may be deposited selectively. For example, the metal coating layer may be deposited, and some areas of the metal coating layer that are not needed for connection formation may be removed through one or more lithography and/or etching steps.

Next, the metal contacts 260 may be formed the cavities 257 of the precision glass 256. In some embodiments, the metal contacts 260 may be stamped metal contacts, which are pre-formed and then placed within the cavities 257 of the precision glass 256. In some embodiments, the metal contacts 260 may be formed using one or more plating processes in the cavities 257 of the precision glass 256. The metal contacts 260 are separated from one another by the glass walls or by the dielectric layer. In some embodiments, instead of using the stamped metal contacts, metal material may be deposited or formed in areas where metal is needed. Other structures, such as end captures 262 may be attached to form the plug 258. The plug 258 in FIG. 2B1 may be the plug 102 of the B2B connector 100 in FIG. 1A.

Figure 2C:
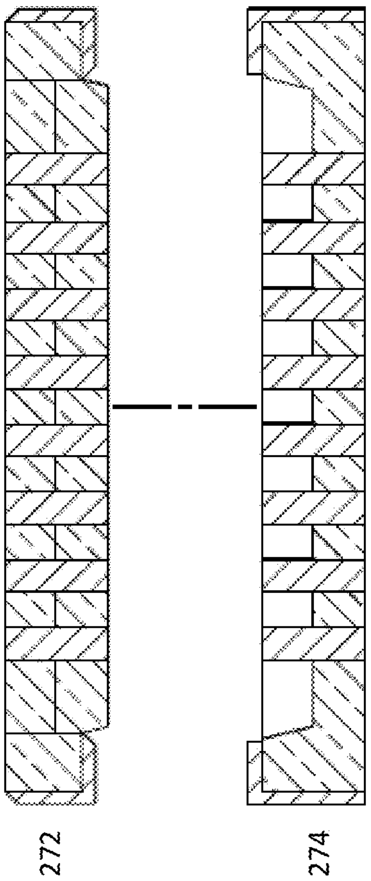
FIG. 2C shows cross-section views of how a plug may be inserted into a receptacle, according to some embodiments.

FIG. 2C shows cross-section views of how a plug 272 (along the AA-AA' direction) may be inserted into a receptacle 274 (along the A-A' direction), according to some embodiments. The plug 272 may be the plug 258 shown in FIG. 2B1. The receptacle 274 may be the receptacle 206 or the receptacle 210 in shown in FIG. 2A1.

The embodiment techniques provide high precision control on size tolerances and on the locations of the B2B connector contacts and the body of the B2B connector. The metal contacts of the B2B connector can be placed closer to one another than a conventional B2B connector because the glass has higher dielectric strength than the plastic used in a conventional B2B connector. Further, different cavity shapes can be made in the glass using precision laser structuring technology, etching steps, lithographic techniques described above, or combinations thereof. In addition, metal contacts can be plated on the glass.

Figure 2D:
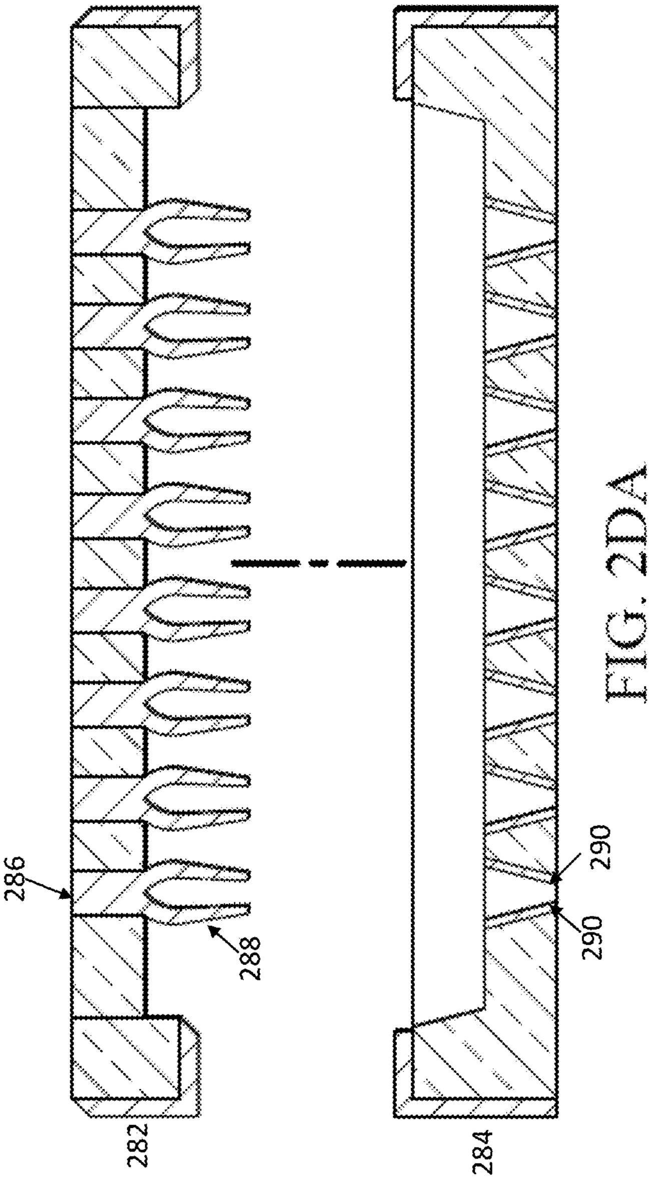
FIG. 2DA shows cross-section views of an example plug and an example receptacle, according to some embodiments.
Figure 2D:
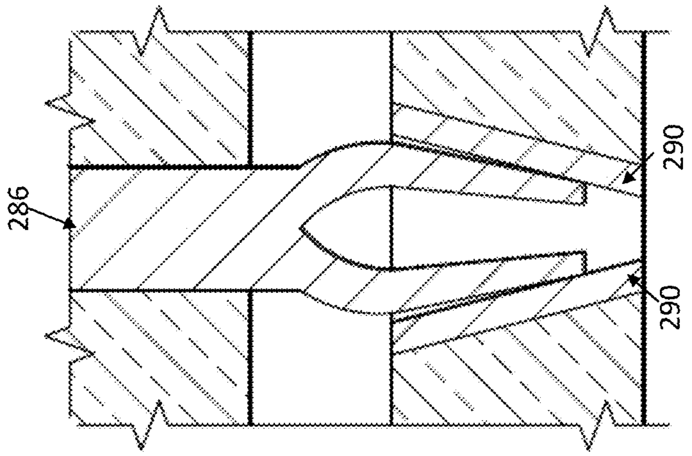

FIG. 2DA shows cross-section views of an example plug 282 (along the AA-AA' direction) and an example receptacle 284 (along the A-A' direction), according to some embodiments. The plug 282 in FIG. 2DA may be the same or similar to the plug 272 in FIG. 2C, except that each metal contact 286 includes a cone-shaped contact head 288 with a hole inside. The receptacle 284 in FIG. 2DA may be the same or similar to the receptacle 274 in FIG. 2C, except that the cavity between two metal contacts 290 has a trapezoid shape. FIG. 2DB shows cross-section views of how the metal contacts 286 of the plug 282 are connected to the metal contacts 290 of the receptacle 284 when the plug 282 is inserted into the receptacle 284, according to some embodiments. The design of the metal contacts 286 in the plug 282 and the metal contacts 290 in the receptacle 284 helps auto-alignment when the plug 282 is inserted into the receptacle 284.

According to embodiments, the metal contacts (e.g., pogo pins or spring based contact shapes) in the plug can be plated or can be inserted into the glass. According to other embodiments, metal contacts can be formed inside the glass.

Figure 3A:
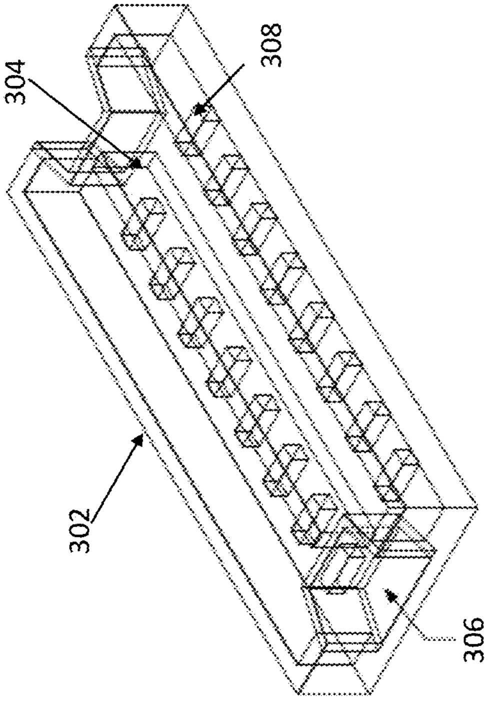
FIGS. 3A-3C illustrate a receptacle of a glass-reinforced B2B connector, according to some embodiments.
Figure 3B:
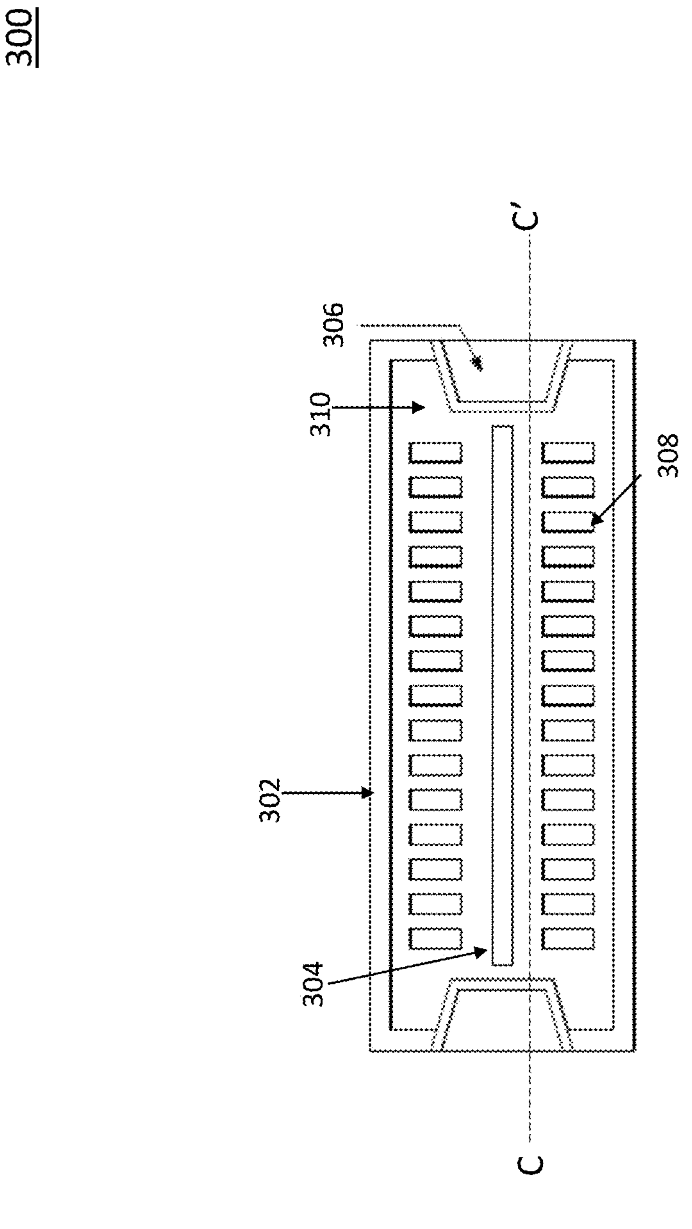
Figure 3C:
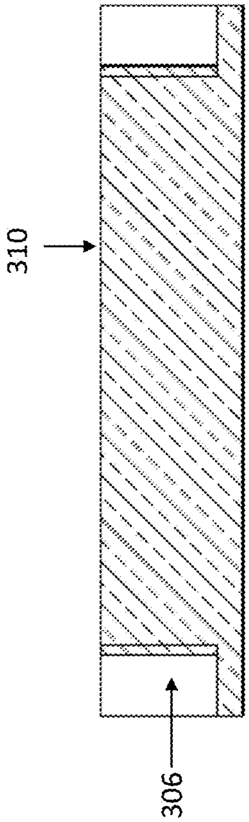

FIGS. 3A-6C show components of B2B connectors without the need of using the end caps, according to some alternative embodiments. FIGS. 3A-3C illustrate a receptacle 300 of a glass-reinforced B2B connector, according to some alternative embodiments. FIG. 3A shows a perspective view of the receptacle 300. FIG. 3B shows a top view of the receptacle 300. FIG. 3C shows a cross-section view of the receptacle 300 along the C-C' direction shown in FIG. 3B. The receptacle 300 includes a glass frame 302. The receptacle 300 further includes a glass frame 304 in the middle to help the alignment when a corresponding plug is inserted into the receptacle 300 through cavity 310. The receptacle 300 also includes recesses 306 for alignment with the corresponding plug. In addition, the receptacle 300 includes etched pattern 308 for the metal contacts connecting to the board (e.g., a main PCB).

Figure 4A:
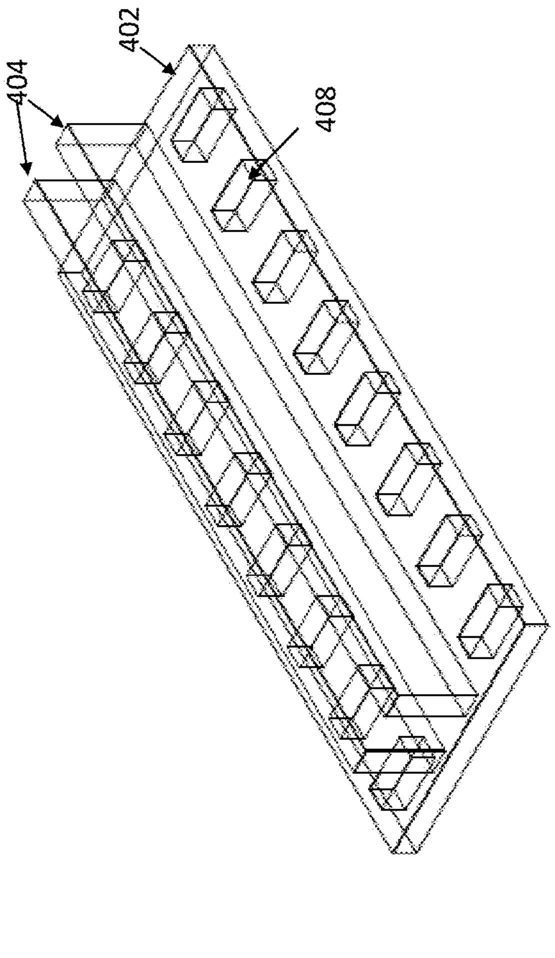
FIGS. 4A-4B illustrate elements of a plug of a glass-reinforced B2B connector, according to some embodiments.
Figure 4B:
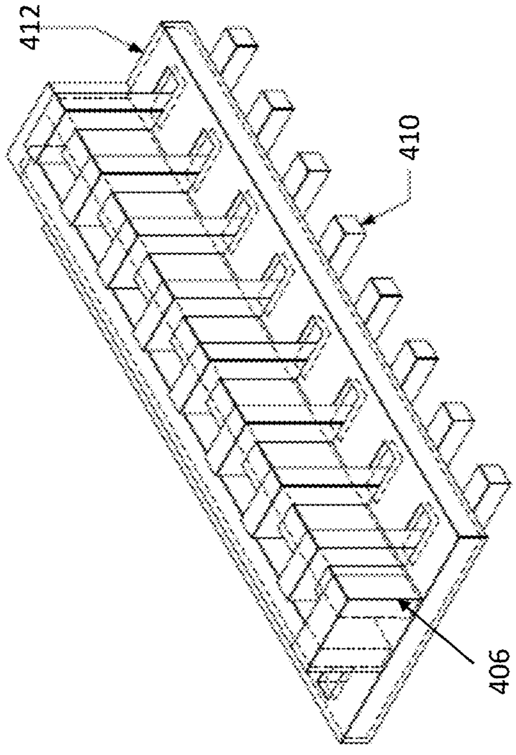

FIGS. 4A-4B illustrate elements of a plug 400 of a glass-reinforced B2B connector, according to some alternative embodiments. The plug 400 and the receptacle 300 may be of the same glass-reinforced B2B connector. FIG. 4A shows a perspective view of some elements of the plug 400. The plug 400 includes a glass frame 402 at the bottom. The plug 400 also includes two glass frames 404 in the middle to help the alignment when the plug 400 is inserted into the receptacle 300. Further, the plug 400 includes cavities 408.

FIG. 4B shows a perspective view of additional elements of the plug 400. The plug 400 may include a layer of mold (or paint or coating) 412 on the outside walls of the glass frame 402 and on the outside walls of the glass frames 404. Metal contacts 410 may be plated into the cavities 408, or stamped metal contacts may be inserted into the cavities 408. Further, the plug 400 may include alignment elements 406 that can be inserted into the corresponding recesses 306 of the receptacle 300.

Figure 5A:
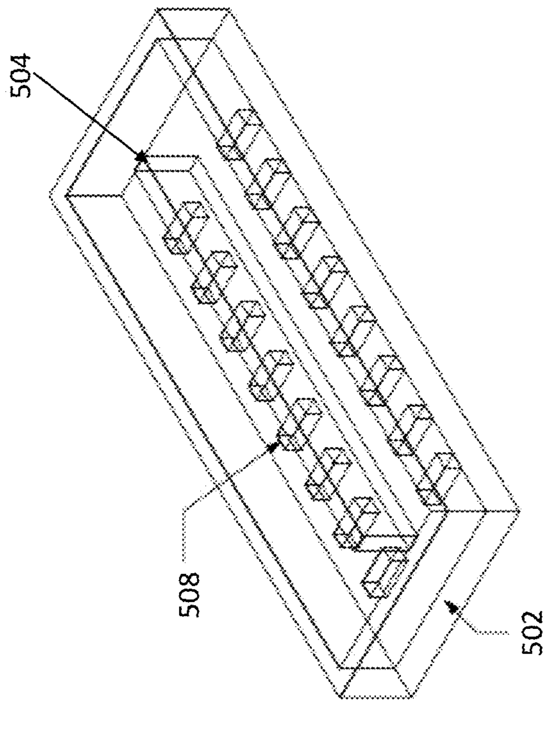
FIGS. 5A-5D illustrate a receptacle of a glass-reinforced B2B connector, according to some embodiments.
Figure 5B:
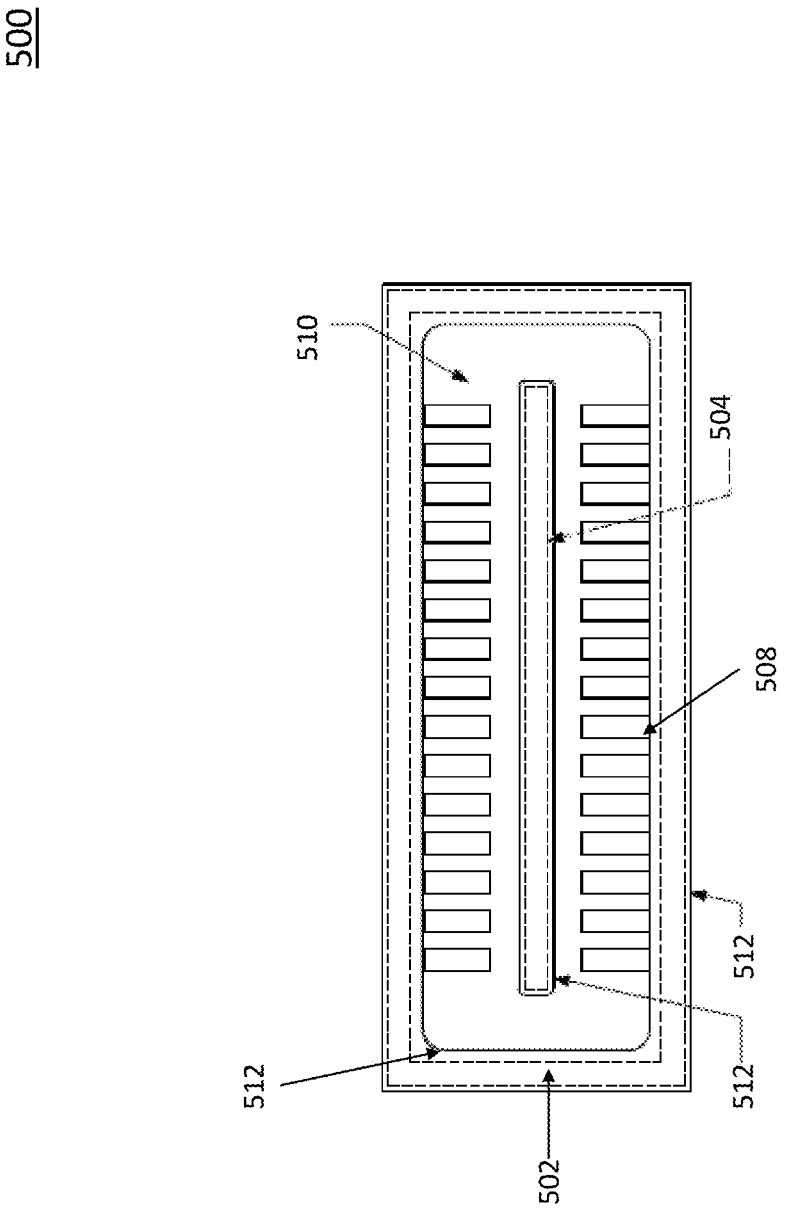

FIGS. 5A-5D illustrate a receptacle 500 of a glass-reinforced B2B connector, according to some alternative embodiments. FIG. 5A shows a perspective view of the receptacle 500. FIG. 5B shows a top view of the receptacle 500 after the molding process. The receptacle 500 includes a glass frame 502. The receptacle 500 further includes a glass frame 504 in the middle to help the alignment when a corresponding plug is inserted into the receptacle 500 through cavity 510. In addition, the receptacle 500 includes etched pattern 508 for the metal contacts connecting to the board (e.g., a main PCB). After the molding process, as shown in FIG. 5B, the receptacle 500 further includes mold 512 on the outside walls and on inside walls of the glass frame 502 and on the outside walls of the glass frame 504.

Figure 5C:
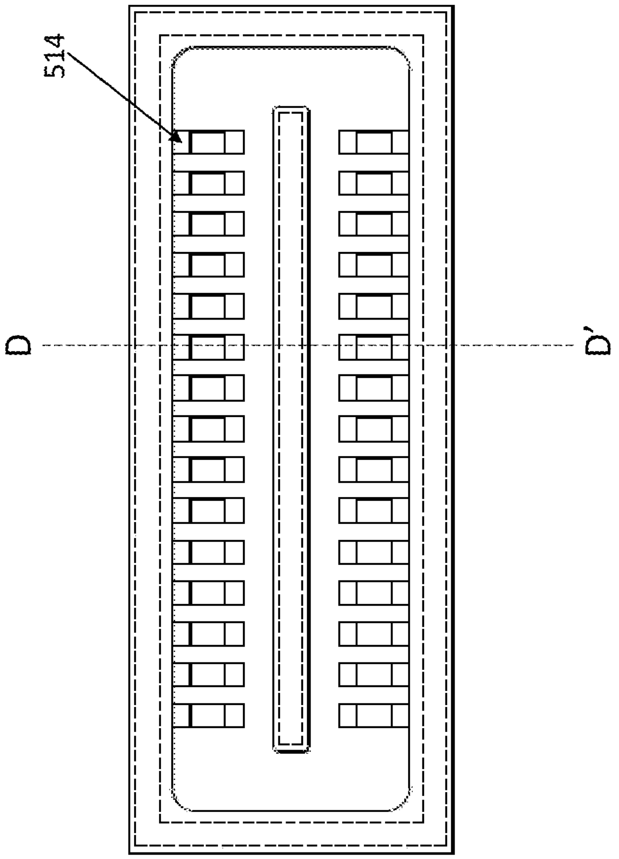
Figure 5D:
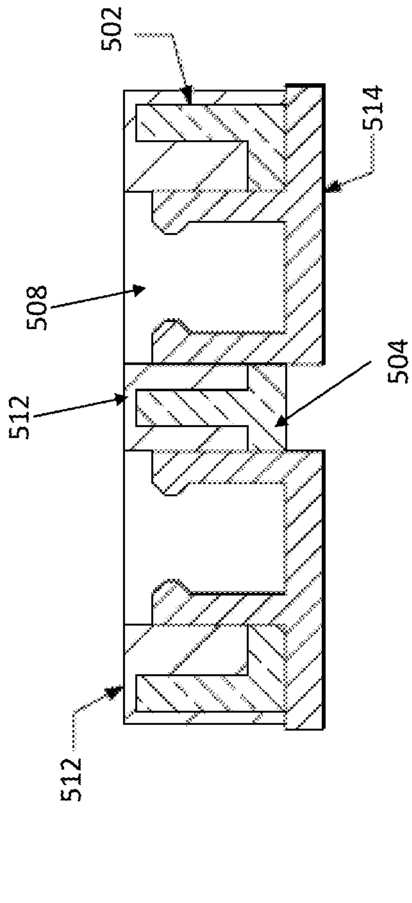

FIG. 5C shows another top view of the receptacle 500, with metal contacts 514 inserted (or plated) in the etched pattern 508. FIG. 5D shows a cross-section view of the receptacle 500 along the D-D' direction shown in FIG. 5C. The elements in the cross-section view in FIG. 5C may also be applicable to the receptacle 400.

Figure 6A:
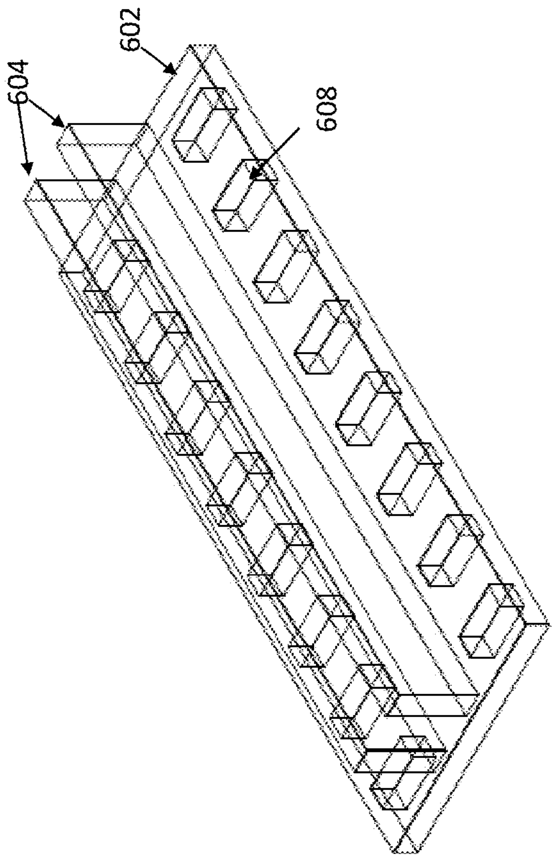
FIGS. 6A-6C illustrate elements of a plug of a glass-reinforced B2B connector, according to some embodiments.
Figure 6B:
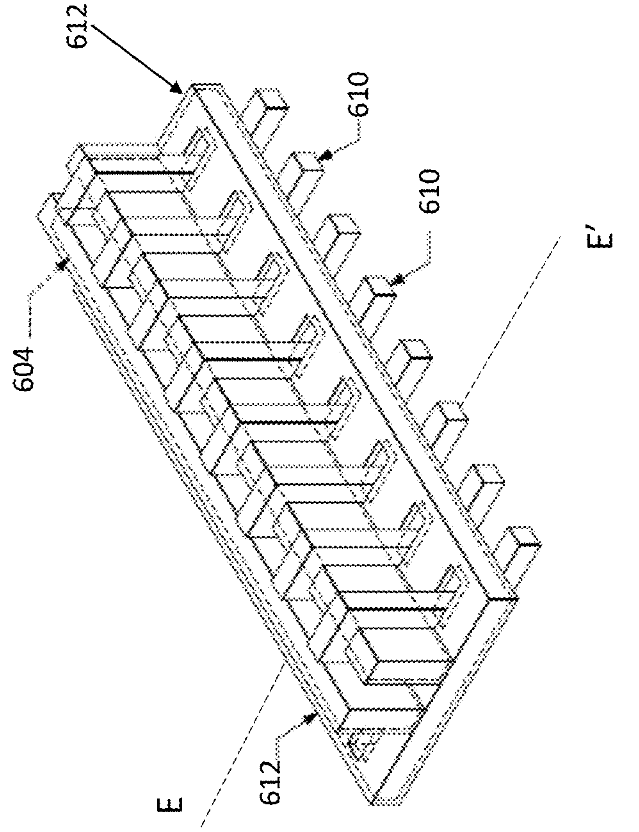
Figure 6C:
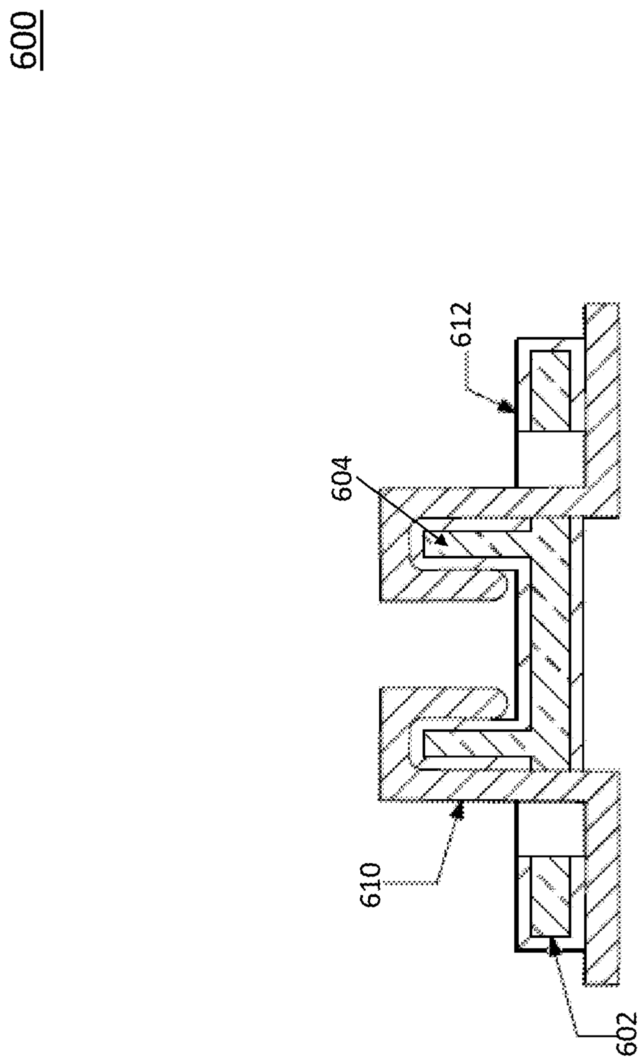

FIGS. 6A-6C illustrate elements of a plug 600 of a glass-reinforced B2B connector, according to some alternative embodiments. The plug 600 and the receptacle 500 may be of the same glass-reinforced B2B connector. FIG. 6A shows a perspective view of some elements of the plug 600. The plug 600 includes a glass frame 602 at the bottom. The plug 600 also includes two glass frames 604 in the middle to help the alignment when the plug 600 is inserted into the receptacle 500. Further, the plug 600 includes cavities 608.

FIG. 6B shows a perspective view of additional elements of the plug 600. The plug 600 may include a layer of mold (or paint or coating) 612 on the outside walls of the glass frame 602 and on the outside walls of the glass frames 604.

Metal contacts 610 may be plated into the cavities 608, or stamped metal contacts 610 may be inserted into the cavities 608. FIG. 6C shows a cross-section view of the plug 600 along the E-E' direction shown in FIG. 6B. The elements in the cross-section view in FIG. 6C may also be applicable to the plug 500.

Figure 7:
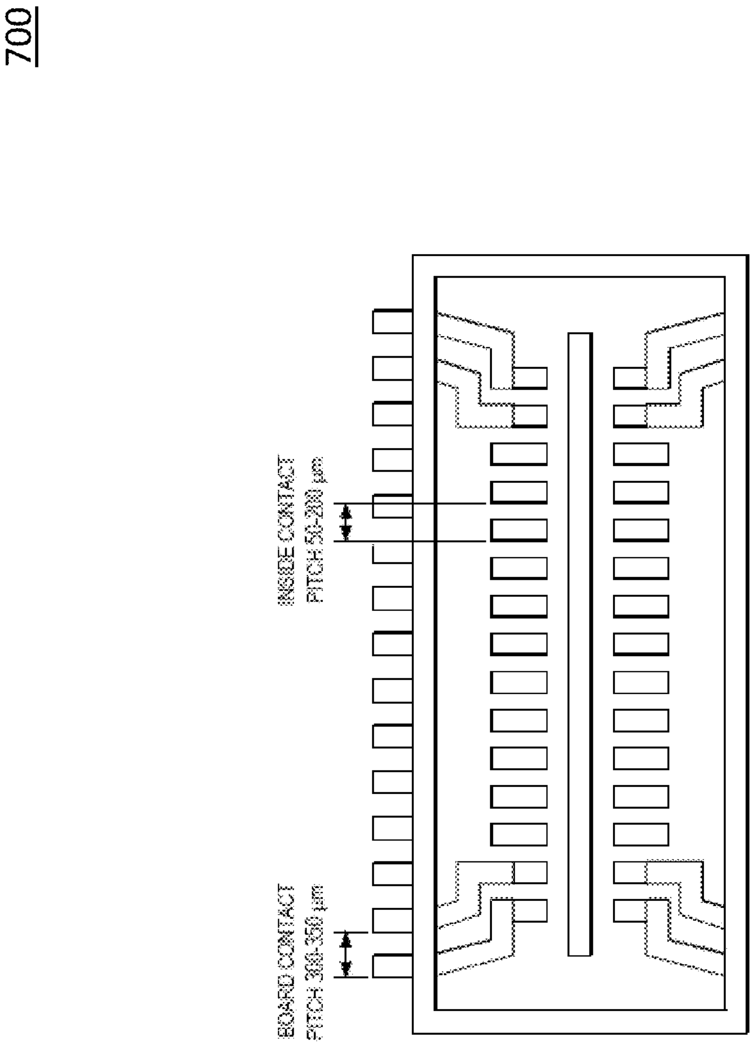
FIG. 7 shows a scheme of using metallic traces on the glass to reduce contact areas of a B2B connector, according to some embodiments.

FIG. 7 shows a scheme of using metallic traces on the glass to reduce contact areas of a B2B connector, according to some embodiments. The receptacle 700 in FIG. 7 may be applicable to any receptacle described above. As shown in FIG. 7, the inside contact pitch may be in the range of 50 μm to 200 μm. The board contact pitch of the contacts connected to the board (e.g., the main PCB) may be in the range of 300 μm to 500 μm.

Figure 8:
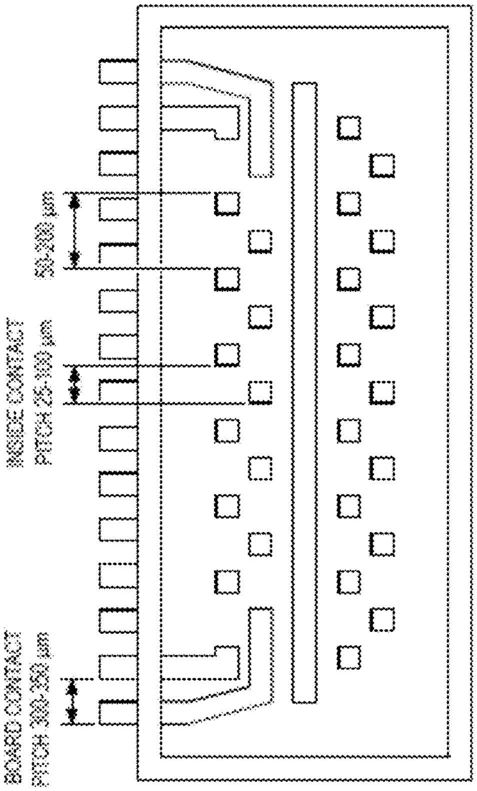
FIG. 8 shows a scheme of further reduction in the contact pitch by alternating contact pins' locations, according to some embodiments.

FIG. 8 shows a scheme of further reduction in the contact pitch by alternating contact pins' locations, according to some embodiments. The receptacle 800 in FIG. 8 may be applicable to any receptacle described above. As shown in FIG. 8, the inside contact pitch between two neighboring contacts in the same row may be in the range of 25 μm to 100 μm. The inside contact pitch between two neighboring contacts in two different rows may be in the range of 25 μm to 100 μm. The board contact pitch of the contacts connected to the board (e.g., the main PCB) may be in the range of 300 μm to 500 μm.

In accordance with some embodiments, a board-to-board (B2B) connector comprises an array of contacts and a housing holding the array of contacts. A main body of the housing is made of glass, and the main body occupies at least 50% of the housing in volume. In an embodiment, the B2B connector includes at least one of a plug or a receptacle. In an embodiment, a dielectric constant of the main body of the housing is between 3 and 10, a dielectric strength of the main body of the housing is at least 10 MV/m, a modulus of rigidity of the main body of the housing is at least 20 GPa, and a coefficient of thermal expansion (CTE) of the main body of the housing is at most $9.0\times10^{-6}$ m/(m K). In an embodiment, a number of the array of contacts is at least 100, and a length of the B2B connector is at most 1 cm. In an embodiment, a length of the B2B connector is at most 5 mm. In an embodiment, a pitch between two neighboring contacts of the array of contacts is between 50 μm and 2 mm. In an embodiment, the B2B connector excludes any end cap. In an embodiment, the B2B connector includes two end caps, and a total length of the two end caps is at most 25% of a length of the B2B connector. In an embodiment, the B2B connector further includes a connector wall having a metal coating layer, that allows the B2B connector to exclude a metal shielding frame. The metal coating layer is made of at least one of Ti, Cu, Ni, Au, or Fe. In an embodiment, the housing further includes at least one dielectric film layer on the main body of the housing. The at least one dielectric film layer is made of at least one of $SiO_x$, $SiN_x$, $TaN_x$, TiO2, $Al_2O_3$, or $HfO_x$. In an embodiment, the housing further holds at least one of a capacitor or an inductor. In an embodiment, the array of contacts is made of glass coated with a metal material. In an embodiment, the housing is transparent. In an embodiment, a dielectric constant of the housing is at least 3, a dielectric strength of the housing is at least 14 MV/cm, and a coefficient of thermal expansion (CTE) of the housing is at most $8\times10^{-6}$ m/(m K). In an embodiment, the array of contacts are at least partially disposed in a plurality of openings in the main body of the housing. The housing further includes an organic material or a polymeric compound encasing the main body of the housing.

In accordance with some embodiments, a board-to-board (B2B) connector comprises an array of contacts and a housing holding the array of contacts. The housing includes a plurality of layers of glass, each layer of the plurality of layers of glass coated with a dielectric layer, and outside walls of each layer of the plurality of layers of glass further are coated with a metal layer. In an embodiment, a pitch between two neighboring contacts of the array of contacts is at most 50 μm. In an embodiment, a dielectric constant of the housing is between 3 and 10, a dielectric strength of the housing is at least 10 MV/m, a modulus of rigidity of the housing is at least 20 GPa, and a coefficient of thermal expansion (CTE) of the housing is at most $9.0\times10^{-6}$ m/(m K). In an embodiment, a pitch between two neighboring contacts of the array of contacts is between 50 μm and 2 mm.

In accordance with some embodiments, a method includes patterning a connector structure in a base glass to create a base structure. The base structure includes an array of cavities. The method further includes depositing a dielectric layer on the base structure, depositing a metal coating layer on outside walls of the base structure, and after the depositing the dielectric layer and the depositing the metal coating layer, plating or inserting an array of conductive contacts into the array of cavities of the base structure.

In accordance with some embodiments, a method includes patterning a connector structure in a plurality of layers of glass. The plurality of layers of glass includes an array of cavities after the patterning. The method further includes depositing a dielectric layer on each layer of the plurality of layers of glass, depositing a metal coating layer on outside walls of the each layer of the plurality of layers of glass, after the depositing the dielectric layer and the depositing the metal coating layer, laminating or bonding the plurality of layers of glass, and after the laminating or bonding, inserting an array of conductive contacts into the array of cavities of the plurality of layers of glass.

Embodiments of this disclosure provide the B2B connector with the glass body alone or with the glass body encapsulated in plastic or coated with organic or inorganic materials. The embodiment B2B connector is significantly stronger than a conventional B2B connector with a plastic body.

The embodiment B2B connector with the higher mechanical rigidity of the glass construction eliminates or significantly reduces the size of the end caps. In some embodiments, the end caps may be completely eliminated from the embodiment B2B connector.

With the embodiment structure, a small (e.g., a few mm long) B2B connector or a large B2B connector (e.g., 100+ pins) can be made because glass does not warp and has a coefficient of thermal expansion (CTE) closer to that of a printed circuit board (PCB). So, the embodiment B2B connector reduces stresses in the solder joints significantly.

The embodiment B2B connector can eliminate the need for shielding metal frame around the main body of the B2B connector by depositing or spray coating of the connector wall with metallic coating, thereby reducing the size. Different metals can be used for deposition, such as Ti, Cu, Ni, Au, or various other compounds known in the art, or combinations thereof. Depending on the frequencies to be shielded, the outside body of the B2B connector can also be deposited with multilayer films such as Ti, Cu, Fe, Ni, etc., or combinations thereof.

The glass body of the B2B connector can also be deposited with a layer of dielectric film or inert films that prevent exposure of glass to outside caustic elements or cleaning agents that might be used during board assembly. Common dielectric films such as Si filled epoxy films, $SiO_x$, $SiN_x$, $TaN_x$, $TiO_2$, $Al_2O_3$, $HfO_x$ (e.g., $HfO_2$), etc., or combinations thereof, can also be deposited on the glass by using various such as spray painting, depositing, lamination, CVD, ALD, etc.

After depositing dielectric layers on the glass, capacitors or inductors can also be formed in the glass body to improve signal integrity of the B2B connector. This can eliminate the need for additional capacitors near the B2B connector to save more space on the board.

The high dielectric strength of the glass and additional dielectric films deposited on the glass used in the embodiment B2B connector allow compact arrangement of connector contacts.

In some embodiments, the use of plated glass to create the connector leads eliminates the need for stamped metal interconnects.

In some embodiments, the connector contacts can be made entirely out of glass by etching the glass in a similar manner described above. These contacts can then be deposited and plated with metals such as Cu, Ni, Ag, Au, etc., or combinations thereof.

The embodiment B2B connector using glass as the main body also provides the ability to inspect solder joints under the transparent body of the B2B connector.

Using precision laser structuring technology, etching steps, lithographic techniques described above, or combinations thereof, to create varying patterns on the glass, depends on the application of the B2B connector.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A board-to-board (B2B) connector component comprising:

an array of contacts; and a housing holding the array of contacts, wherein at least a portion of the housing is made from a glass sheet having a plurality of cavities formed within the glass sheet, each cavity configured to hold a corresponding contact of the plurality of contacts.

2. The B2B connector component of claim 1, wherein the connector component is one of a receiver or a plug of the board-to-board connector.

3. The B2B connector component of claim 1, wherein a dielectric constant of the housing is at least 3, a dielectric strength of the housing is at least 10 MV/m, a modulus of rigidity of the housing is at least 20 GPa, and a coefficient of thermal expansion (CTE) of the housing is at most $9.0\times10^{-6}$ m/(m K).

4. The B2B connector component of claim 1, wherein a number of contacts in the array of contacts is at least 100, and a length of the B2B connector is at most 1 cm.

5. The B2B connector component of claim 1, wherein a length of the B2B connector is at most 5 mm.

6. The B2B connector component of claim 1, wherein a pitch between two neighboring contacts of the array of contacts is between 50 μm and 2 mm.

7. The B2B connector component of claim 1, further comprising:

a pair of metallic end caps positioned on opposite ends of the B2B connector component.

8. The B2B connector component of claim 1, further comprising:

a connector wall having a metal coating layer formed on at least a surface of the glass housing portion.

9. The B2B connector component of claim 8, wherein the metal coating layer is made of at least one of Ti, Cu, Ni, Au, or Fe.

10. The B2B connector component of claim 1, wherein the housing further includes at least one dielectric film layer encasing at least a portion of the glass.

11. The B2B connector component of claim 10, wherein the at least one dielectric film layer is made of at least one of $SiO_x$, $SiN_x$, $TaN_x$, TiO2, $Al_2O_3$, or $HfO_x$.

12. The B2B connector component of claim 1, wherein the housing further holds at least one of a capacitor or an inductor.

13. The B2B connector component of claim 1, wherein the array of contacts is made of glass coated with a metal material.

14. The B2B connector component of claim 1, wherein the glass is transparent.

15. The B2B connector component of claim 1, wherein a dielectric constant of the housing is at least 3, a dielectric strength of the housing is at least 14 MV/cm, and a coefficient of thermal expansion (CTE) of the housing is at most $8\times10^{-6}$ m/(m K).

16. The B2B connector component of claim 1, wherein the array of contacts are at least partially disposed in a plurality of openings in the portion of the housing, and wherein the housing further includes an organic material or a polymeric compound encasing the portion of the housing.

17. A board-to-board (B2B) connector component comprising:

an array of contacts; and a housing holding the array of contacts, wherein the housing includes a plurality of layers of glass, each layer of the plurality of layers of glass being coated with a respective dielectric layer, and wherein outside walls of each layer of the plurality of layers of glass are further coated with a metal layer.

18. The B2B connector component of claim 17, wherein a pitch between two neighboring contacts of the array of contacts is at most 50 μm.

19. The B2B connector component of claim 17, wherein a dielectric constant of the housing at least 3, a dielectric strength of the housing is at least 10 MV/m, a modulus of rigidity of the housing is at least 20 GPa, and a coefficient of thermal expansion (CTE) of the housing is at most $9.0\times10^{-6}$ m/(m K).

20. The B2B connector component of claim 17, wherein a pitch between two neighboring contacts of the array of contacts is between 50 μm and 2 mm.

* * * * *